(12) United States Patent
Huynh et al.

(10) Patent No.: US 7,616,459 B2
(45) Date of Patent: Nov. 10, 2009

(54) SYSTEM AND METHOD FOR A PRIMARY FEEDBACK SWITCHED MODE POWER SUPPLY

(75) Inventors: Steven Huynh, Santa Clara, CA (US); Mingliang Chen, Seterrett, AL (US); Mingfan Yu, Shanghai (CN)

(73) Assignee: Active-Semi, Inc. (VG)

( * ) Notice: Subject to any disclaimer, the term of this patent is extended or adjusted under 35 U.S.C. 154(b) by 406 days.

(21) Appl. No.: 11/635,309

(22) Filed: Dec. 7, 2006

(65) Prior Publication Data
US 2007/0133234 A1    Jun. 14, 2007

Related U.S. Application Data

(60) Provisional application No. 60/748,132, filed on Dec. 7, 2005.

(51) Int. Cl.
*H02M 3/335* (2006.01)

(52) U.S. Cl. ........................ 363/21.12; 363/41

(58) Field of Classification Search .............. 363/21.01, 363/21.08, 21.12–21.18, 40, 41; 327/95, 327/96; 341/122, 163; 330/250
See application file for complete search history.

(56) References Cited

U.S. PATENT DOCUMENTS

| | | | | |
|---|---|---|---|---|
| 5,438,499 A | * | 8/1995 | Bonte et al. ............... | 363/21.16 |
| 5,901,051 A | * | 5/1999 | Takahashi et al. ......... | 363/21.18 |
| 6,249,876 B1 | * | 6/2001 | Balakrishnan et al. ...... | 713/501 |
| 6,636,084 B2 | * | 10/2003 | Sarraj ........................ | 327/95 |
| 7,102,899 B2 | * | 9/2006 | Reinhard et al. .......... | 363/21.01 |
| 7,199,745 B2 | * | 4/2007 | Tachibana et al. ........... | 341/163 |
| 7,307,390 B2 | * | 12/2007 | Huynh et al. ............... | 315/291 |
| 7,388,764 B2 | * | 6/2008 | Huynh et al. ............. | 363/21.16 |

\* cited by examiner

*Primary Examiner*—Jessica Han
(74) *Attorney, Agent, or Firm*—Imperium Patent Works; Joseph S. Spano

(57) ABSTRACT

A primary side controlled power converter having a voltage sensing means coupled to a transformer of the power converter and configured to provide a voltage feedback waveform representative of an output of the transformer is provided. A primary switching circuit operates to control energy storage of a primary side of the transformer. The primary switching circuit is operable during an on time and inoperable during an off time. The on and off time is switched at a system frequency. A feedback amplifier generates an error signal indicative of a difference between the voltage feedback waveform and a reference voltage. A sample and hold circuit samples the error signal at a periodic frequency during the off time. An error signal amplifier is configured to provide the sampled value to the primary switching circuit wherein the primary switching circuit controls the transformer and thereby regulates an output of the power converter.

44 Claims, 10 Drawing Sheets

FEEDBACK SAMPLING METHOD
(8 SAMPLING CAPACITORS EMBODIMENT)

FEEDBACK SAMPLING AND HOLD BLOCK
(8 SAMPLING CAPACITORS EMBODIMENT)

AN EMBODIMENT OF GATE DRIVER
FOR EMI REDUCTION

SYSTEM AND METHOD FOR A PRIMARY FEEDBACK SWITCHED MODE POWER SUPPLY

CROSS-REFERENCE TO RELATED APPLICATIONS

The present Utility patent application claims priority benefit of the U.S. provisional application for patent Ser. No. 60/748,132 filed on Dec. 7, 2005 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

This invention relates generally to the field of power conversion and, more particularly, to switching mode power supply with regulated output voltage.

BACKGROUND OF THE INVENTION

With the aggressive growth of cell phones and personal computers, the demand for lower cost, lighter weight and better efficiency battery chargers and small power standby supplies for personal computers is very high. Even though the linear power supply is low in cost, it becomes very difficult to compete with switching mode power supplies because of its heavy weight and low efficiency. The Flyback power converter is generally chosen among different switching mode topologies to meet this demand due to its simplicity and good efficiency. Over the years, various control ICs had been developed and used to build a Flyback power supply. FIG. 1 shows a typical prior art primary side controlled Flyback power converter. It consists of a transformer 201 which has three windings, primary switch 105, secondary-side rectifier 302, output capacitor 303 and a control IC 104. Resistor 101 and capacitor 102 provides the initial start-up energy for IC 104. Once the Flyback converter is stable, IC 104 will be powered by the auxiliary winding (with $N_A$ turns) of transformer 201 via rectifier 103. The output voltage is fed back to the primary side via the auxiliary winding, rectified and filtered by rectifier 107 and capacitor 110, and sensed by the voltage divider resistor 108 and 109. Resistor 106 senses the current flowing through the primary switch 105. IC 104 is a peak current mode PWM controller. Secondary resistor 301 represents the copper loss of transformer 201.

The circuit of FIG. 1 works well as long as the requirement of output voltage regulation is not stringent. Typically, a 10% load regulation with the loading from 10% to 100% of its rated maximum load can be met. However, the regulation becomes very poor when loading drops below 10% of its rated load. There are two factors causing the poor regulation: 1) the transformer copper loss varies with output current and input voltage; and 2) the auxiliary winding of transformer 201 contains an undesired resonant waveform when the Flyback converter operates in a discontinuous current mode (DCM). To achieve a tighter regulation requirement, others have used the prior art secondary side controlled Flyback converter shown in FIG. 2. This configuration generally meets a 5% load regulation over 0% to 100% of its rated load. In this circuit, the output voltage is sensed and an error signal is then fed back to the primary IC via the optical coupler. The main disadvantage of this circuit is higher cost. The additional components and a safety approved optical coupler add significant cost to the overall design. This additional material cost can be up to 10% more than the primary side converter shown in FIG. 1.

FIG. 2 shows a typical prior art secondary side controlled Flyback converter. In this circuit, the output voltage is sensed by the voltage divider resistor 305 and 307, and monitored by the secondary IC 306. The error signal is then fed back to the primary IC 104 via the optical coupler 202. The main disadvantage of this circuit is high cost. The IC 306 and the safety approved optical coupler 202 significantly increases the cost of type of converter. This cost increase can be as much as 10% of the overall material cost as compared to a primary side converter of FIG. 1.

In view of the foregoing, there is a need for a low-cost and effective control methodology that can regulate the output voltage of a Flyback converter from the primary side within good accuracy from 0% to 100% of its rated load.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
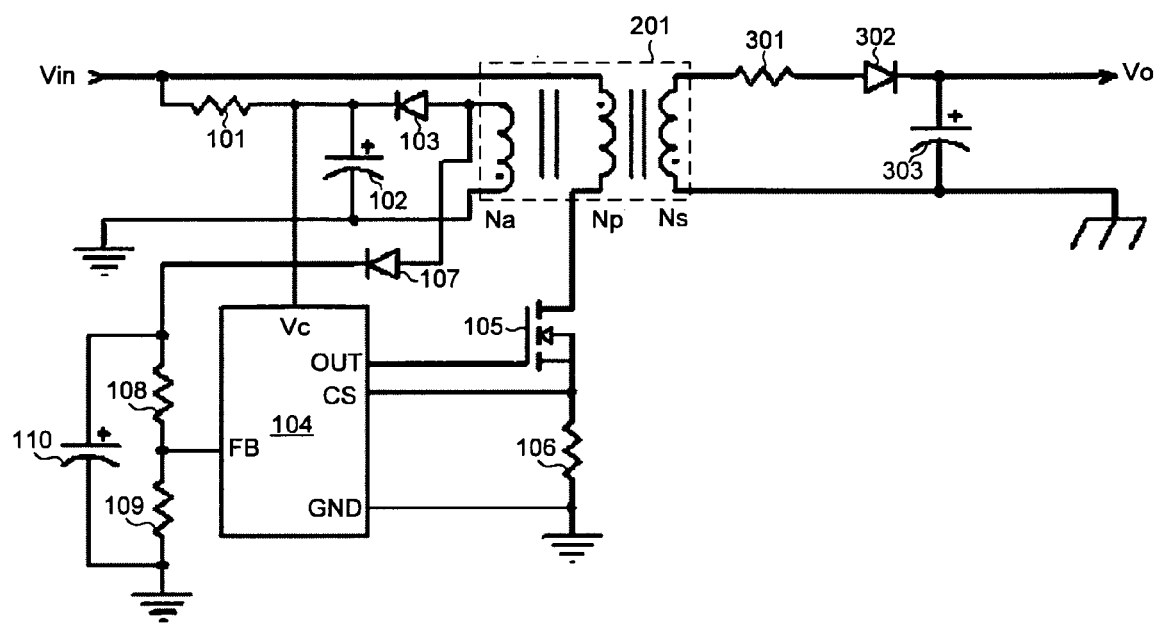
FIG. 1 shows a simple prior art primary side controlled constant output voltage Flyback converter.
Figure 2:
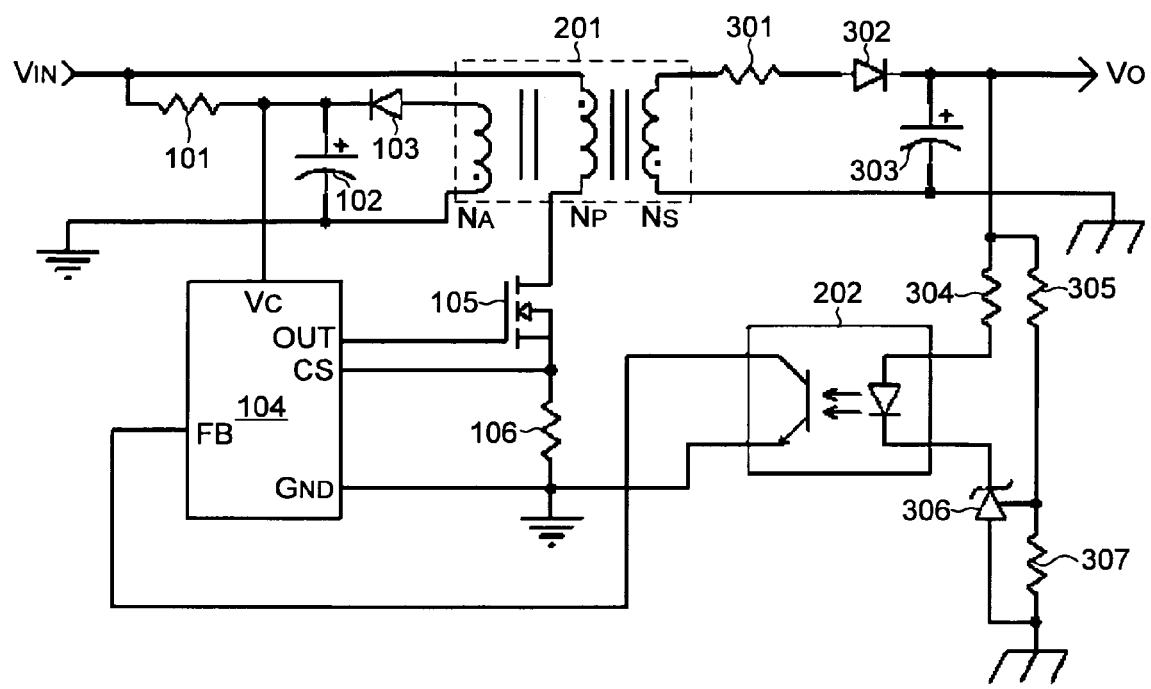
FIG. 2 shows a typical prior art secondary side controlled Flyback converter.

Unless otherwise indicated illustrations in the figures are not necessarily drawn to scale.

SUMMARY OF THE INVENTION

To achieve the forgoing and other objects and in accordance with the purpose of the invention, a variety of techniques for primary side controlled power converter are described.

In one embodiment of the invention, a primary side controlled power converter has a voltage sensing means coupled to a transformer of the power converter and configured to provide a voltage feedback waveform representative of an output of the transformer. A primary switching circuit operable to control energy storage of a primary side of the transformer is provided. The primary switching circuit has a loop stability compensation node signal input, and the primary switching circuit is operable during an on time and inoperable during, an off time, the on time and the off time being switched at a system frequency. A feedback sample and hold circuit operable to amplify the feedback error signal and sample this error signal at a periodic frequency during the off time is described. The sample and hold circuit has a sampled value output. A timing means for generating a hold signal thereby stopping the sampling prior to a threshold detection event is provided. An error signal amplifier configured to integrate by way of the loop stability compensation node and to provide the sampled value to the primary switching circuit wherein the primary switching circuit controls the transformer and thereby regulates an output of the power converter is described. Further embodiments include a current sensing means for sensing a current in the primary side and configured to input to the primary switching circuit a value for regulation of the output current of the power converter. Also, a threshold circuit means for comparing the feedback signal to a threshold voltage, the threshold circuit means operable to activate the hold signal when the feedback signal is below the threshold voltage is described. The power converter also is provided in this embodiment as having an output current limit programming circuit being configured to enable the switch current limit level to be externally programmable with a resistor. Other embodiments also include a frequency jittering means for jittering the system frequency to reduce electromagnetic interference emissions. An embodiment also is shown as having a frequency adjusting means for adjusting the system frequency in response to the error signal. An embodiment also contains an under-voltage lock-out (UVLO), for enabling the power converter when the power supply to the power converter is within a pre-determined range. Another embodiment describes the sample and hold circuit having a plurality of capacitors, a plurality of control switches and a plurality of selection switches wherein a one of the capacitors may be selected for the sampled value. A further embodiment shows the primary switching circuit further having a driver configured to modulate rise and fall times of the switching for reducing electromagnetic interference emissions.

In another embodiment, primary side controlled power converter is described having a voltage sensing means for sensing a transformer output voltage, a primary switching means for controlling energy in a primary winding of the transformer, a feedback means for generating an error signal, and a control means for controlling the error signal to the primary switching means wherein the primary switching means controls the transformer and thereby regulates an output of the power converter. A further embodiment includes a frequency adjusting means for adjusting the system frequency in response to the feedback signal. Another embodiment has a driver means for modulating rise and fall times of the primary switching means for reducing electromagnetic interference emissions.

In yet another embodiment, an integrated circuit device for a primary side controlled power converter is provided. The device has a primary switching circuit operable to control an energy storage of a primary side of a transformer, the primary switching circuit comprising a error signal input, and the primary switching circuit being operable during an on time and inoperable during an off time, the on time and the off time being switched at a system frequency. A feedback amplifier configured to generate an error signal indicative of a difference between the voltage feedback waveform and a reference voltage is provided. A sample and hold circuit operable to sample the error signal at a periodic frequency during the off time is described. The sample and hold circuit has a sampled value output. A timing means for generating a hold signal thereby stopping the sampling prior to the on time is provided. An error signal amplifier configured to provide the sampled value to the primary switching circuit wherein the primary switching circuit controls the transformer and thereby regulates an output of the power converter is described.

In a further embodiment a method for regulating the output voltage and output current of a power supply from a primary side of a transformer is described. The method comprises sensing a feedback voltage from an auxiliary winding of the transformer, sampling the feedback voltage or feedback error voltage at a determined time, sensing a current of a primary of the transformer, regulating an output voltage of the power supply by maintaining the voltage waveform of the auxiliary winding of the transformer using the sampled feedback voltage, and regulating all output current of the power supply by controlling a fixed peak current through the primary of the transformer with a variable switching frequency. Another embodiment includes the sampling operating a plurality of sequentially connected sampling and holding capacitors and selecting the voltage of a determined one of the capacitors when the feedback voltage of the auxiliary winding of the transformer drops below a threshold voltage. A further embodiment includes the variable switching frequency being controlled proportionally to the sensed feedback voltage of the auxiliary winding of the transformer.

In still another embodiment a sample and hold circuit for a power converter IC device is provided. The IC device has a feedback amplifier; for generating an error voltage. N number of capacitors for sampling and holding the error voltage signal are shown connected to N controlled sampling switches for sampling and holding the error voltage signal to one of the N capacitors. N controlled selecting switches are shown for selecting the error voltage signal from one of the N capacitors. A counter for dividing the frequency of the clock signal and generating a binary bit map is described. A decoder is described for producing control signals for the N controlled sampling switches and N controlled selecting wherein the error signal is sampled N times within a period of time and one of the sampled times may be selected for output of the sample and hold circuit.

Another embodiment shows driver for driving a gate of a MOSFET device used in a power converter. The driver has switches for charging and discharging the gate terminal of the MOSFET device. The default charging path comprises a first resistor connected between the gate terminal and the charging switch. The default discharging path comprises a second resistor connect between the gate terminal and discharging switch. A first plurality of switched resistors are connected at one end of the gate terminal, and a first plurality of switches are operable to connect the other end of the first plurality of resistors to the charging switch. A second plurality of resistors are connected at one end to the gate terminal, and a second plurality of switches are operable to connect the other end of the second plurality of resistors to the discharging switch. A controller controls the first and second plurality of switches in a manner such that the charging and discharging times of the gate-source of the MOSFET are varied and cycled over time.

In an additional embodiment, a primary side controlled power converter with internal integrated circuit power switch is coupled to the emitter of a high voltage NPN bipolar transistor, whether internal or external to the IC, in order to achieve high voltage emitter-switching operation.

Other features, advantages and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular applications to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa where appropriate, and alternatives embodiments do not necessarily imply that the two are mutually exclusive.

The present invention will now be described in detail with reference to embodiments thereof as illustrated in the accompanying drawings.

It is to be understood that any components, exact component values, or circuit configurations indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One aspect of this invention is to present a low-cost, effective control methodology that can regulate the output voltage of a Flyback converter from the primary side with good accuracy for output load current ranging from 0% to 100% of its rated load. By achieving this goal, the secondary side control circuit and the optical coupler can be eliminated. This can dramatically save the cost and improve the reliability of a Flyback converter because of lower component count. Based on this methodology, two IC devices will be described in detail below.

As mentioned earlier, the two factors affecting the voltage regulation of a primary side controlled Flyback converter are that the transformer copper loss varies with output current and input voltage and the voltage sensing is not accurate. To overcome the first problem, in one embodiment, a current source derived from the current of the primary switch is used to compensate the variations. In another embodiment, an adaptive sampling and hold circuit is used to capture the feedbacks voltage when the current of the secondary winding of the transformer discharges to zero. It is contemplated that alternative embodiments may properly combine both methods together. Two IC devices will be described below. Both IC embodiments are capable of self-starting from the input line through a large value charging resistor and an energy storage capacitor. Once the Flyback converter is stable, the auxiliary winding provides power to the ICs. The first IC is configured for an internal power MOSFET as the main switch and a current sense MOSFET. Therefore, no external MOSFET or current sense resistor is needed for low power application. The IC can also be used to drive a bipolar transistor in emitter-drive configuration, or another high voltage MOSFET in source-drive configuration to boost high voltage operating range or output power. To further increase output power handling, the second IC is configured such that its output stage circuit is capable of driving an external power MOSFET and sense switch current.

Figure 3:
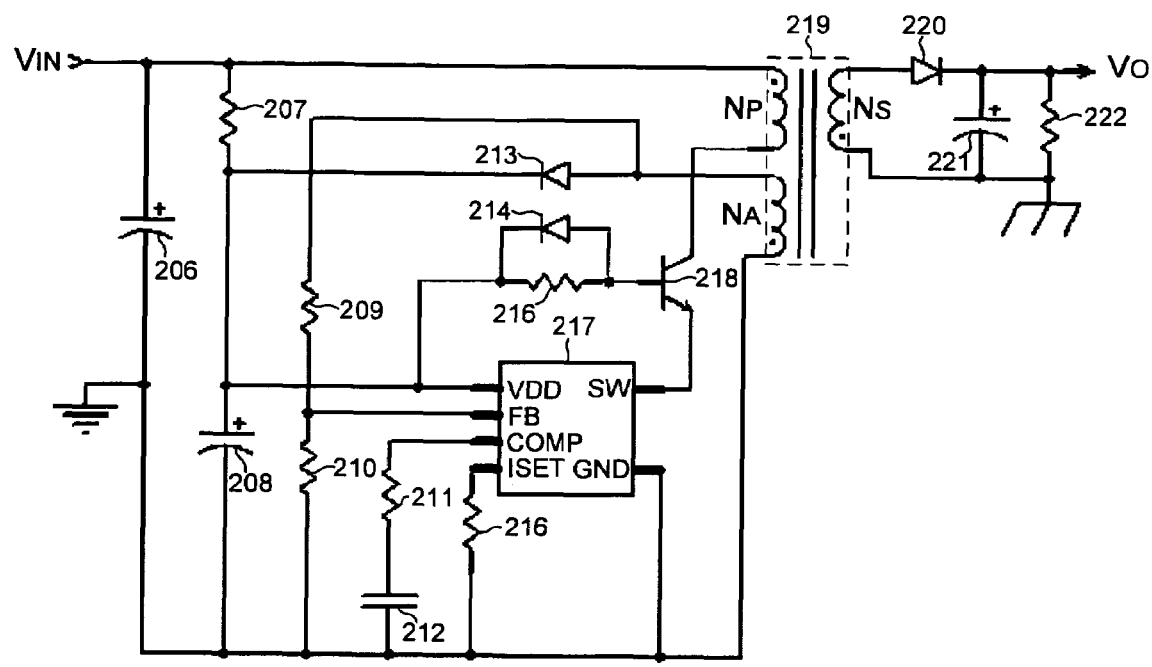
FIG. 3 illustrates an exemplary primary side controlled constant output voltage Flyback converter, in accordance with an embodiment of the present invention.

FIG. 3 illustrates all exemplary primary side controlled constant output voltage Flyback converter, in accordance with an embodiment of the present invention. The converter has a transformer 219. The transformer has three windings, a primary with $N_p$ turns, secondary with $N_s$ turns and auxiliary with $N_a$ turns. A secondary-side rectifier 220 with output capacitor 221 provides regulated power output. A peak current mode PWM control IC 217 controls the power to the primary winding of the transformer via transistor 218. By driving the bipolar transistor in emitter-drive configuration, the operating voltage of the Flyback converter is increased due to normally higher collector-base breakdown voltage than collector-emitter breakdown voltage. Resistor 207 and capacitor 208 provide the initial start-up energy for IC 217. After the Flyback converter is stable, IC 217 is powered by the auxiliary winding of transformer 219 via rectifier 213 and capacitor 208. The output voltage is fed back to the primary side via the auxiliary winding and the voltage divider resistors 209 and 210. Resistors 209 and 210 may be placed inside the IC in other embodiments. The Comp and Iset pins of IC 217, and components 211, 212, and 216, are for this exemplary embodiment and may be removed or placed inside the IC in other embodiments.

Figure 4:
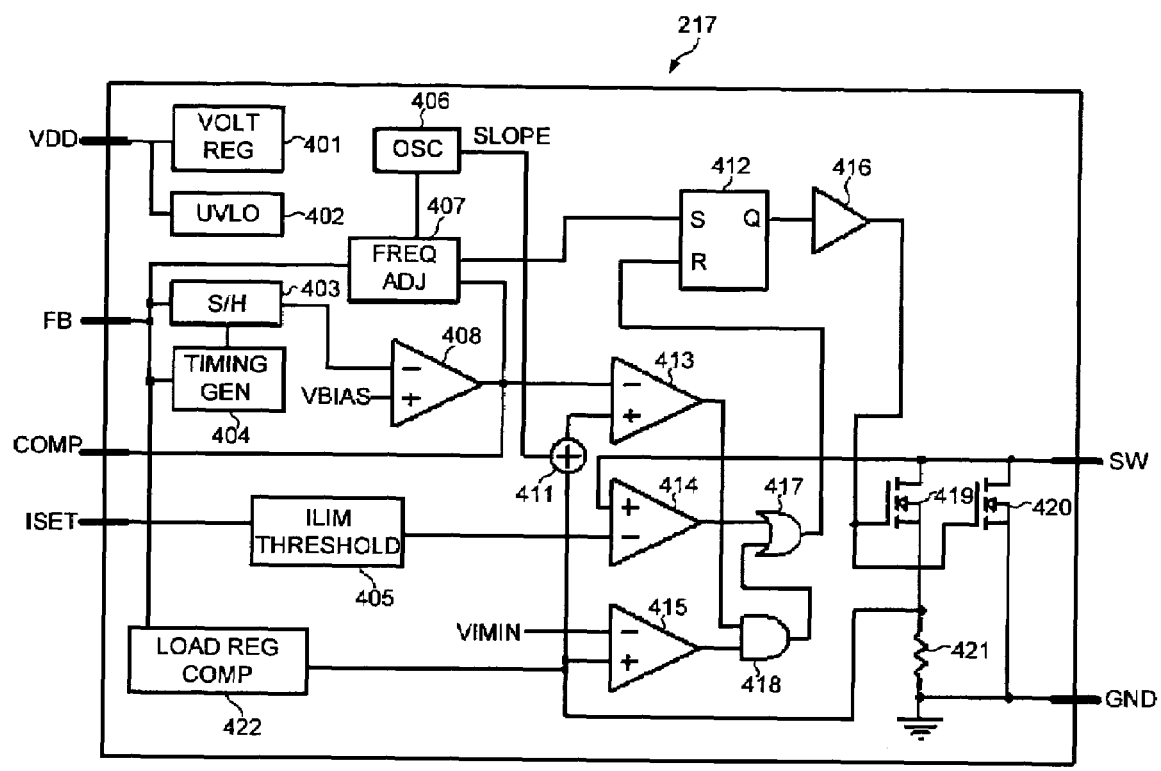
FIG. 4 is an exemplary top level block diagram of an IC, in accordance with an embodiment of the present invention.

FIG. 4 illustrates an exemplary top level block diagram of IC chip 217, in accordance with an embodiment of the present invention. IC 217 contains an internal power MOSFET 420 as the main switch, a current sense MOSFET 419 and a current sense resistor 421 as shown in FIG. 4.

Voltage regulator 401 generates internal power supply and reference voltages as well as provides voltage clamp function on Vdd. The feedback voltage is amplified against a reference voltage and then sampled and held by 403. Error Amplifier 408 compares the output of 403 and a bias voltage ($V_{BIAS}$). The preferred embodiment has an external compensation network on the Comp pin. Comparator 413 serves as a peak current mode PWM comparator with a slope compensation input from oscillator 406. Oscillator 406 is a system oscillator that may have frequency jittering function in some embodiments. The jittering function spreads out the frequency spectrum clock. This allows for a lower conducted electromagnetic interference (EMi) emission. The Frequency Adjuster 407 stores the FB voltage immediately after the switch turn-off plus a blanking time, and modifies the oscillator 406's frequency proportionally to this stored FB voltage as FB goes below regulation voltage. In this manner, the power transferred across the transformer is controlled to be proportional to the output voltage, resulting in constant output current mode as the output voltage drops below regulation. In addition, the Frequency Adjuster 407 detects when the Error Amplifier 408 output is indicative of very light load, and reduces switching frequency to conserve power. The latch 412, together with its control signals, generates the PWM waveform. High speed MOSFET gate driver 416, in some embodiments, incorporates EMI reduction by gate drive strength modulation technique shown in FIG. 9, described next. The power MOSFET 420 serves as the main output switch. MOSFET 419 and resistor 421 form a current sense circuit. Timing generator 404 generates high frequency clock and sampling control signals, senses the negative going-edge of FB waveform and produces TR triggering signal for the sample-and-hold circuit 403. The load regulation compensation block 422, in some embodiments, sinks a current from FB based on a scaling of the primary current sense signal to compensate for output load regulation or output series resistance. The ILIM Threshold block 405 enables for external programming of the switch current limit comparator 414 threshold, while minimum pulse current comparator 415 ensures a minimum pulse current for stable voltage sensing.

Figure 5:
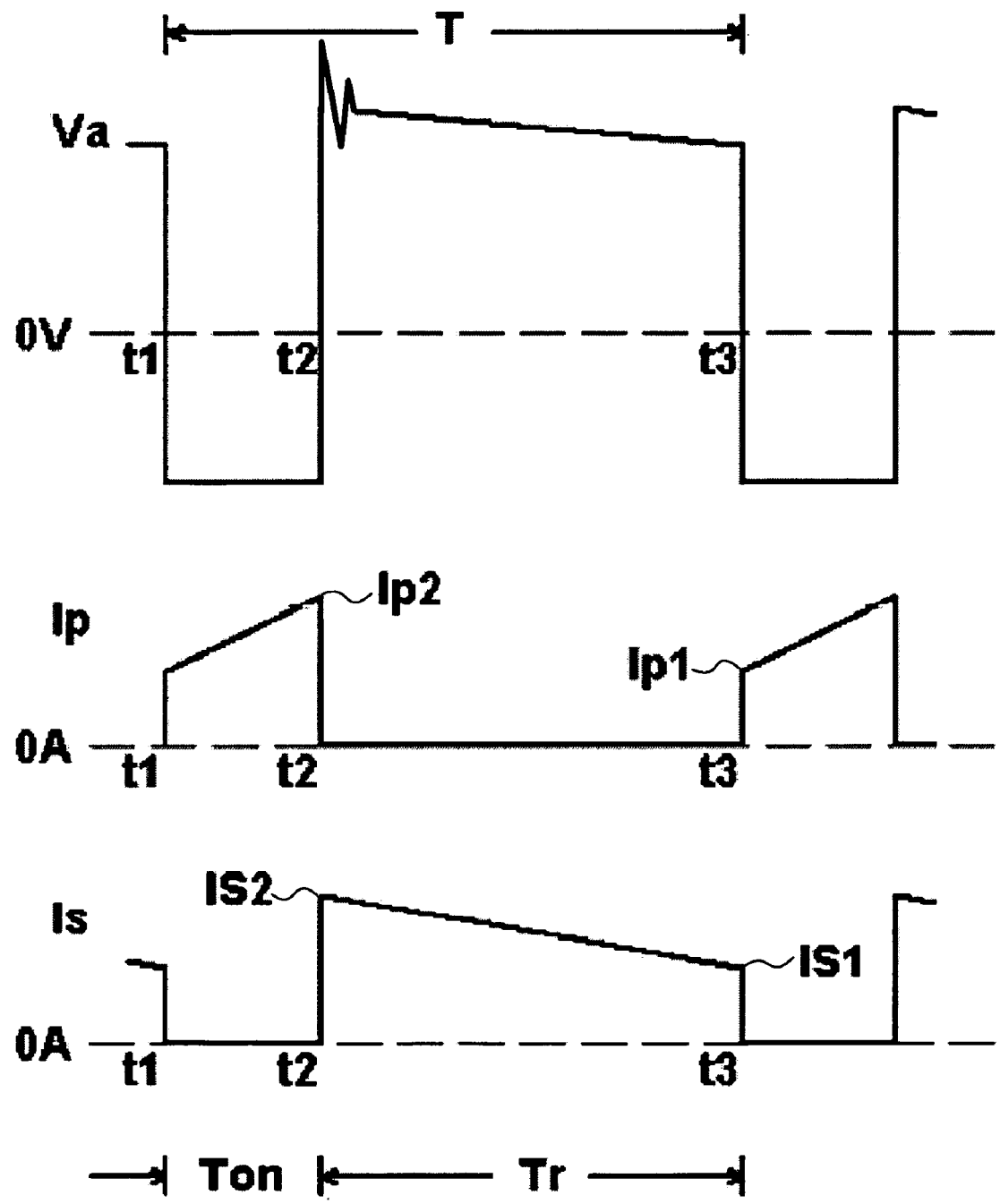
FIG. 5 shows exemplary idealized waveforms of the auxiliary winding voltage, primary switch current and secondary rectifier current of a Flyback converter operating in a continuous current mode (CCM)

FIG. 5 shows exemplary idealized waveforms of the auxiliary winding voltage, primary switch current and secondary rectifier current of a Flyback converter operating in a continuous current mode (CCM). The main switch turns on at $t_1$, turns off at $t_2$ and turns on again at $t_3$. The switching period is T, the turn-on time is $T_{ON}$ and the turn-off time is $T_r$. The voltage at the auxiliary winding ($V_{79}$) at the time just before $t_3$ can be expressed as, $$V_A = (N_A/N_S) \cdot (V_O + V_{D1} + I_S \cdot R_S) \quad (1)$$

where $N_A$ is the number of turns of the transformer auxiliary winding, $N_S$ is the number of turns of the transformer secondary winding, $V_O$ is the output voltage, $V_{D1}$ is the secondary-side rectifier diode voltage drop, $I_S$ is the secondary current at $t_3$, and $R_S$ is the transformer secondary side copper and parasitic resistance.

The shunt current sink in load regulation compensation block 422 inside the IC shown in FIG. 4 is designed for the following relationship:

$$I_{422} = \beta \cdot I_P \quad (2)$$

Where $I_P$ is the primary winding current, and $\beta$ is a design constant.

Since $$I_P = (N_S/N_P) \cdot I_S \quad (3)$$

Where $I_S$ is the secondary winding current, and $N_P$ is the transformer primary winding turns.

The output voltage sense $V_{FBSENSE}$ can be expressed by, $$V_{FBSENSE} = (R_2/(R_1+R_2)) \cdot (N_A/N_S) \cdot (V_O + V_{D1} + I_S \cdot R_S) - ((R_1 \cdot R_2)/(R_1+R_2)) \cdot \beta \cdot I_S \cdot (N_S/N_P) \quad (4)$$

Where $R_1$ is the resistor connected between the transformer auxiliary winding node and FB, and $R_2$ is the resistor connected between FB and ground. If $R_1$ is chosen as $$R_1 = (N_P \cdot N_A \cdot R_S)/(\beta \cdot N_S \cdot N_S) \quad (5)$$

Then, $$V_{FBSENSE} = (R_2/(R_1+R_2)) \cdot (N_A/N_S) \cdot (V_O + V_{D1}) \quad (6)$$

Therefore, if the shunt current sink of 422 inside the IC shown in FIG. 4 is designed according to equation (2) and the value of $R_1$ is chosen by equation (5), then output voltage sense $V_{FBSENSE}$ is independent of the copper loss ($I_S \cdot R_S$) of the transformer 201. In the CCM, the value of $V_{FBSENSE}$ is sampled and held at the time just before $t_3$.

Figure 6:
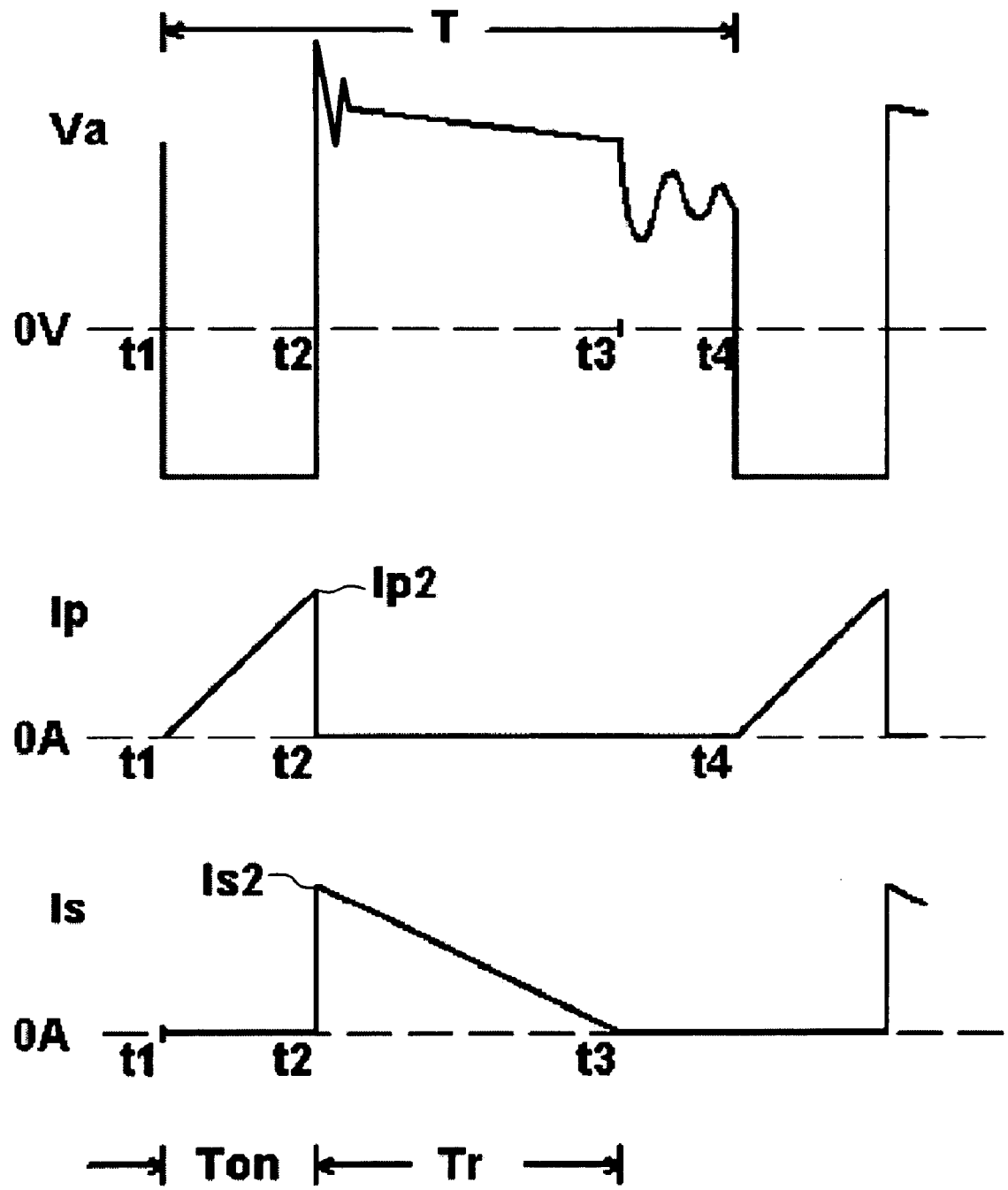
FIG. 6 shows exemplary idealized waveforms of the auxiliary winding voltage, primary switch current and secondary rectifier current of a Flyback converter operating in a discontinuous current mode (DCM)

In addition, if the value of $R_1$ is chosen higher than the previously calculated value, the output voltage can achieve negative load regulation. This is often useful in certain application to compensate for any additional line resistance such as due to long cord length of charger adapters FIG. 6 shows exemplary idealized waveforms of the auxiliary winding voltage, primary switch current and secondary rectifier current of a Flyback converter operating in a discontinuous current mode (DCM). The main switch turns on at $t_1$, turns off at $t_2$ and turns on again at $t_4$. The switching period is T, the turn-on time is $T_{ON}$ and the turn-off time is equal to $(t_4-t_2)$. $T_r$ is equal to $(t_3-t_2)$. As shown in FIG. 6, the current at the secondary winding $I_S$ of transformer 201 discharges to zero at $t_3$. The voltage at the auxiliary winding $V_a$ at the time between $t_3$ and t4 oscillates at a frequency determined by the parasitic inductance and capacitance in the circuit. In this case the $V_{FBSENSE}$ must be sampled and held at a time just before $t_3$ in order to obtain accurate feedback voltage.

Figure 7:
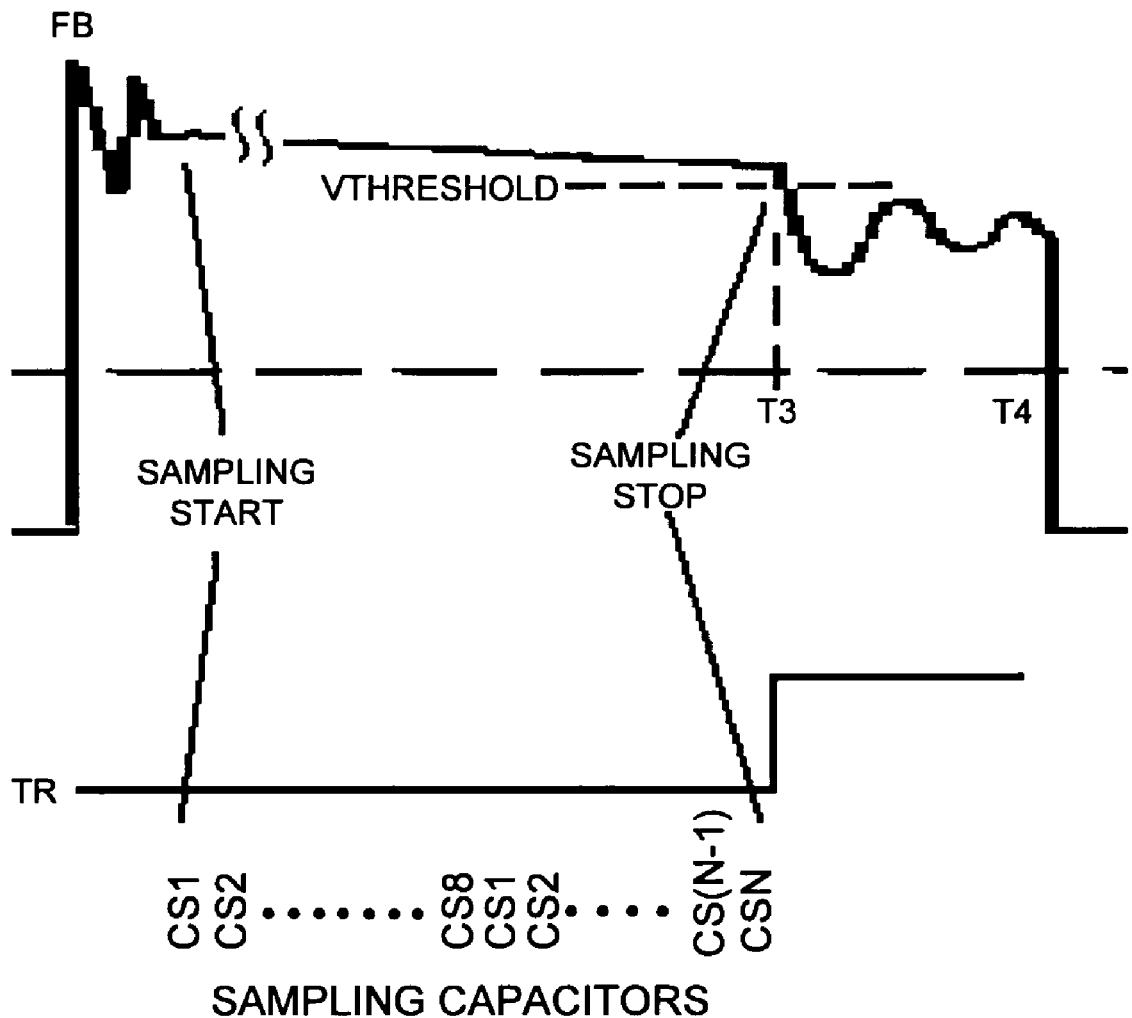
FIG. 7 illustrates an exemplary sampling method for feedback signal, in accordance with an embodiment of the present invention.

FIG. 7 illustrates an exemplary sampling method for the feedback signal, in accordance with an embodiment of the present invention. In particular, the figure shows an embodiment for sampling of feedback voltage $V_{FB}$ and sensing Of $t_3$ in a DCM. After the power switch turns off in a switching cycle, a high frequency oscillator clock from a timing generator is enabled to repeatedly sample the feedback voltage value at each fine time step determined by this clock. At the same time, the feedback voltage is also compared to a threshold voltage $V_{THRESHOLD}$. When it is detected that the feedback voltage is lower than $V_{THRESHOLD}$, the signal TR goes high to stop the sampling and present a previously sampled value as the sampled feedback voltage for that switching period. Because the TR event happens asynchronously from the timing generator clock, accuracy is improved as the timing generator clock frequency increases. Two or more samples can also be used to compensate for the asynchronous TR, by weighing those samples based on the timing of TR relative to the clock edges and period. Using adjustments of the weights of the samples, the feedback signal can be sampled at time just prior to the TR event.

Figure 8:
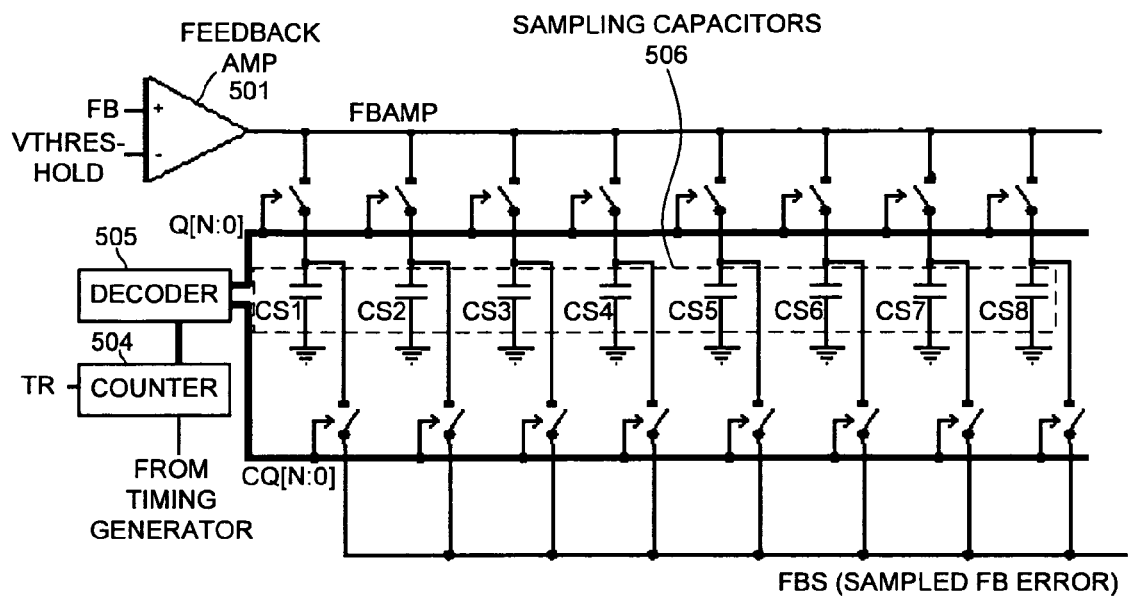
FIG. 8 illustrates an exemplary feedback sampling and hold block, in accordance with an embodiment of the present invention.

FIG. 8 illustrates an exemplary feedback sampling block, in accordance with an embodiment of the present invention. The accuracy of the power converter in the present embodiment is further enhances. Feedback Amplifier 501 amplifies the error difference between feedback signal FB and a reference voltage to generate an instantaneous amplified error signal FBAMP. This FBAMP signal is then sampled repeatedly at high clock frequency from a Timing Generator Clock (not shown). The high frequency clock goes to Counter 504 and Decoder 505 to generate signals Q[N:0] and CQ[N:0] to selectively turn on and off the different switches connected to an array of Sampling Capacitors 506. When TR signal is detected as shown in FIG. 7, the Counter 504 and Decoder 505 stop cycling and the FBS output contains the amplified error signal between $V_{FBSENSE}$ and $V_{REF}$ values. In various embodiments, the FBS output can take any of previously stored sample prior to TR event. Because FBS is an error signal, it can be used directly as an input of the Error Amplifier 408 in FIG. 4. In other embodiments, the feedback signal can be sampled directly before it is amplified or compared against the reference voltage.

Figure 9:
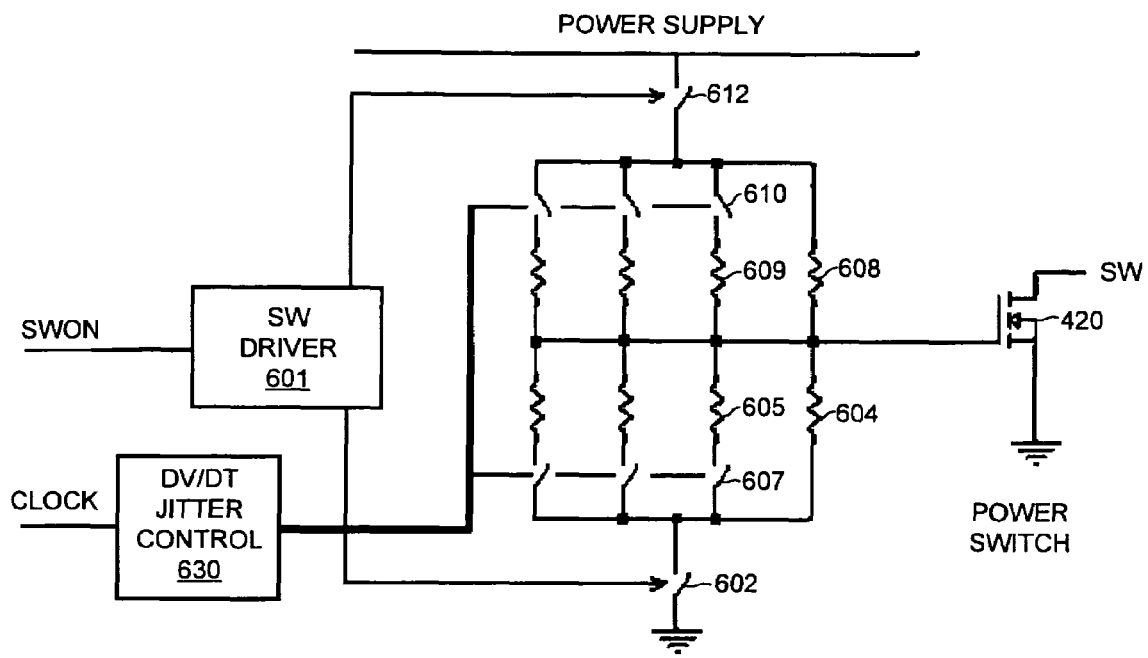
FIG. 9 illustrates an exemplary EMI reduction scheme by modulating the gate driver strength, in accordance with an embodiment of the present invention;.

FIG. 9 illustrates an exemplary EMI reduction scheme by modulating the strength of a gate driver 416, in accordance with an embodiment of the present invention This reduction is achieved by modulating the gate drive strength at a modulation frequency. The buffer 601 receives the PWM latch 412 output signal and amplifies its driving strength to drive the gate charging switch 612 and discharging switch 602. A dV/dt jitter control block 630 takes the clock frequency and generates digital control signals to cycle the strength of the driver over time. Strength modulation switches 610 and 605 vary the impedance between the gate of Power MOSFET 420 and the Power Supply and Ground rails, thereby modulating the rise and fall time of the pulses on the gate of Power MOSFET 420. This results in spreading of high frequency electromagnetic interference due to the fast rise and fall time of SW, and resulting in reduced EM1 signature.

Figure 10:
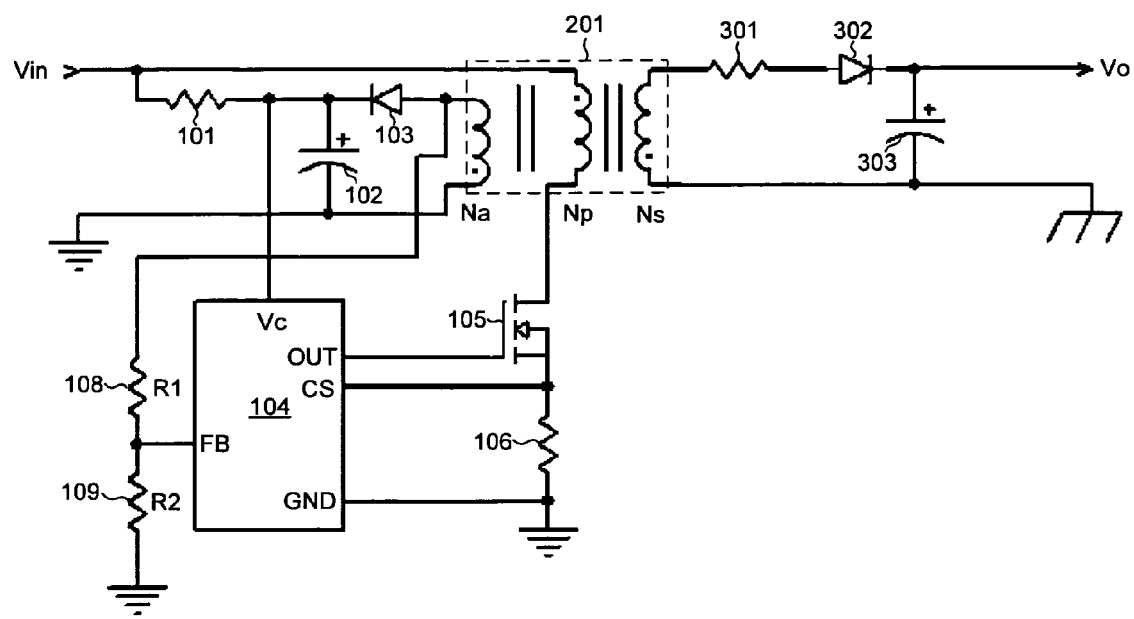
FIG. 10 shows an exemplary primary side controlled constant output voltage Flyback converter using an IC operated in accordance with an embodiment of the present invention.

FIG. 10 shows an exemplary primary side controlled constant output voltage Flyback converter using an IC operated in accordance with an embodiment of the present invention. To better understand the motivation to FIG. 10, it is helpful to note that the embodiment described in FIG. 3 uses an external high voltage NPN Bipolar Transistor 218 in an Emitter Switching configuration. By way of further context, the IC shown in FIG. 4 can alternately be used to directly to drive the primary winding of a transformer, depending on the power requirements. To further increase the power handling capability and switching, frequency, an external MOSFET may be used as the main switch. FIG. 10 shows the application of a further embodiment of an IC. This embodiment removes the internal power MOSFET, the current sensing MOSFET and the current sensing resistor from the IC. The current driving capability of Gate Driver is further improved in order to control the larger external MOSFET. FIG. 10 shows the application circuit of this IC with an external MOSFET and a current sense resistor. In this embodiment, the compensation network (Comp pin) and current programming function (Iset pin) are moved inside the IC.

Those skilled in the art will readily recognize, in accordance with the teachings of the present invention, that any of the foregoing components and/or system modules may be suitably replaced, reordered, removed and additional components and/or system modules may be inserted depending upon the needs of the particular application, and that the systems of the foregoing embodiments may be implemented using any of a wide variety of suitable components and system modules, and is not limited to any particular implementation details that those in the art will readily recognize suitable alternatives for in light of the teachings of the present invention.

Having fully described at least one embodiment of the present invention, other equivalent or alternative synchronous switches for switching regulators according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A power converter comprising:
   a voltage feedback circuit coupled to a transformer of the power converter, wherein the voltage feedback circuit generates a feedback voltage indicative of a voltage across a secondary winding of the transformer;
   a feedback sample-and-hold circuit that holds an error signal indicative of a difference between the feedback voltage and a reference voltage and that generates a sampled error signal; and
   a switching circuit that controls a current flowing through a primary winding of the transformer based on the sampled error signal, wherein the current flows through the primary winding during an on time and does not flow through the primary winding during an off time, wherein the switching circuit regulates an output voltage of the power converter by adjusting the on time and the on time plus the off time, and wherein energy is transferred from the primary winding to the secondary winding during the off time.

2. The power converter of claim 1, wherein the voltage feedback circuit is a resistor divider coupled to a winding of the transformer that is not the primary winding.

3. The power converter of claim 1, wherein the switching circuit includes a power switch that conducts the current flowing through the primary winding to a ground terminal during the on time.

4. The power converter of claim 3, wherein the power switch is a field-effect transistor.

5. The power converter of claim 3, wherein the power switch is coupled to an emitter of a bipolar transistor.

6. The power converter of claim 1, wherein the feedback sample-and-hold circuit holds the error signal during the off time in response to a timing signal.

7. The power converter of claim 1, wherein the feedback sample-and-hold circuit holds the error signal just prior to when the current flowing though the secondary winding discharges to zero.

8. The power converter of claim 1, further comprising:
   a load regulation compensation circuit that reduces variation in the output voltage of the power converter as an output load current increases.

9. The power converter of claim 8, wherein the load regulation compensation circuit compensates for a series resistance at an output of the power converter.

10. The power converter of claim 8, wherein the load regulation compensation circuit adjusts the difference between the feedback voltage and the reference voltage by an amount dependent on the current flowing through the primary winding.

11. The power converter of claim 1, further comprising:
   a jitter control circuit that reduces electromagnetic interference emissions by uttering the frequency at which the switching circuit switches the current flowing through the primary winding.

12. The power converter of claim 1, further comprising:
   a frequency adjuster that modifies the frequency at which the switching circuit switches the current flowing through the primary winding proportionally to the feedback voltage when the feedback voltage is below the reference voltage.

13. The power converter of claim 1, further comprising:
   a frequency adjuster that reduces the frequency at which the switching circuit switches the current flowing through the primary winding when the sampled error signal is indicative of a light load on the power converter.

14. The power converter of claim 1, wherein the feedback sample-and-hold circuit comprises a plurality of capacitors, and wherein the sampled error signal is derived from a voltage across one of the plurality of capacitors.

15. An integrated circuit comprising:
a feedback terminal on which a feedback voltage is present, wherein the feedback voltage depends on a voltage across a secondary winding of a transformer;
a feedback sample-and-hold circuit that holds an error signal indicative of a difference between the feedback voltage and a reference voltage and that generates a sampled error signal;
a switching circuit that controls a current flowing through a primary winding of the transformer based on the sampled error signal, wherein the current flows through the primary winding during an on time and does not flow through the primary winding during an off time, wherein the switching circuit regulates an output voltage of the power converter by adjusting the on time and the on time plus the off time, and wherein energy is transferred from the primary winding to the secondary winding of the transformer during the off time; and
a load regulation compensation circuit that adjusts the output voltage of the power converter to compensate for a series resistance at an output of the power converter.

16. The integrated circuit of claim 15, wherein the feedback terminal is coupled to a resistor divider that is coupled to a winding of the transformer that is not the primary winding.

17. The integrated circuit of claim 15, further comprising:
a ground terminal, wherein the switching circuit includes a power switch that conducts the current flowing through the primary winding to the ground terminal during the on time.

18. The integrated circuit of claim 17, wherein the power switch is a field-effect transistor.

19. The integrated circuit of claim 15, wherein the feedback sample-and-hold circuit holds the error signal during the off time in response to a timing signal.

20. The integrated circuit of claim 15, wherein the feedback sample-and-hold circuit holds the error signal just prior to when a current flowing though the secondary winding discharges to zero.

21. The integrated circuit of claim 15, wherein the load regulation compensation circuit compensates for a series resistance at an output of the power converter.

22. The integrated circuit of claim 15, wherein the load regulation compensation circuit adjusts the difference between the feedback voltage and the reference voltage by an amount dependent on the current flowing through the primary winding.

23. The integrated circuit of claim 15, further comprising:
a jitter control circuit that reduces electromagnetic interference emissions by uttering the frequency at which the switching circuit switches the current flowing through the primary winding.

24. The integrated circuit of claim 15, further comprising:
a frequency adjuster that modifies the frequency at which the switching circuit switches the current flowing through the primary winding proportionally to the feedback voltage when the feedback voltage is below the reference voltage.

25. The integrated circuit of claim 15, further comprising:
a frequency adjuster that reduces the frequency at which the switching circuit switches the current flowing through the primary winding when the sampled error signal is indicative of a light load on the power converter.

26. The integrated circuit of claim 15, wherein the feedback sample-and-hold circuit comprises a plurality of capacitors, and wherein the sampled error signal is derived from a voltage across one of the plurality of capacitors.

27. A method for regulating an output voltage of a flyback converter, comprising:
switching a current flowing through a primary winding of a transformer of the flyback converter, wherein the current flows through the primary winding during an on time and does not flow through the primary winding during an off time;
sensing a feedback voltage indicative of a voltage across a winding on a primary side of the transformer;
generating an error signal indicative of a difference between the feedback voltage and a reference voltage;
holding the error signal during the off time in response to a timing signal;
generating a sampled error signal; and
regulating an output voltage of the flyback converter by adjusting the on time and the on time plus the off time based on the sampled error signal.

28. The method of claim 27, wherein the current flowing through the primary winding during the on time passes through a ground terminal.

29. The method of claim 27, wherein the error signal is held during the off time just prior to when a current flowing though a winding on a secondary side of the transformer discharges to zero.

30. The method of claim 27, further comprising:
compensating for an increase in an output load current so as to reduce variations in the output voltage of the flyback converter.

31. The method of claim 30, wherein the compensating includes adjusting the difference between the feedback voltage and the reference voltage by an amount dependent on the current flowing through the primary winding.

32. The method of claim 27, further comprising:
reducing electromagnetic interference emissions by uttering the frequency at which the current flowing through the primary winding is switched.

33. The method of claim 27, further comprising:
adjusting the frequency at which the current flowing through the primary winding is switched proportionally to the output voltage.

34. The method of claim 27, further comprising:
adjusting the frequency at which the current flowing through the primary winding is switched proportionally to the feedback voltage when the feedback voltage is below the reference voltage.

35. The method of claim 27, further comprising:
reducing the frequency at which the current flowing through the primary winding is switched when the sampled error signal is indicative of a light load on the flyback converter.

36. A method for regulating an output voltage of a flyback power supply, comprising:
switching a current flowing through a primary winding of a transformer of the flyback power supply, wherein the current flows through the primary winding during an on time and does not flow through the primary winding during an off time;
sensing a feedback voltage indicative of a voltage across a winding on a primary side of the transformer;
generating an error signal indicative of a difference between the feedback voltage and a reference voltage;
generating a sampled error signal by sampling the error signal;
regulating an output voltage of the flyback converter by adjusting the on time and the on time plus the off time based on the sampled error signal; and compensating for a change in an output load current so as to reduce variations in the output voltage of the flyback power supply.

37. The method of claim 36, wherein the compensating adjusts the difference between the feedback voltage and the reference voltage to compensate for a series resistance at an output of the flyback power supply.

38. The method of claim 36, wherein the compensating involves adjusting the difference between the feedback voltage and the reference voltage by an amount dependent on the current flowing through the primary winding.

39. The method of claim 36, wherein during the on time the current flowing through the primary winding is conducted to a ground terminal.

40. The method of claim 36, further comprising:
holding the error signal during the off time in response to a timing signal.

41. The method of claim 36, further comprising:
holding the error signal just prior to when a current flowing though a winding on a secondary side of the transformer discharges to zero.

42. The method of claim 36, further comprising:
reducing electromagnetic interference emissions by jittering the frequency at which the current flowing through the primary winding is switched.

43. The method of claim 36, further comprising:
adjusting the frequency at which the current flowing through the primary winding is switched proportionally to the output voltage.

44. The method of claim 36, further comprising:
reducing the frequency at which the current flowing through the primary winding is switched when the sampled error signal is indicative of a light load on the flyback power supply.

* * * * *

UNITED STATES PATENT AND TRADEMARK OFFICE
CERTIFICATE OF CORRECTION

PATENT NO. : 7,616,459 B2  Page 1 of 1
APPLICATION NO. : 11/635309
DATED : November 10, 2009
INVENTOR(S) : Huynh et al.

It is certified that error appears in the above-identified patent and that said Letters Patent is hereby corrected as shown below:

Column 10, line 47, the word "uttering" should be changed to --jittering--.

The text of column 10, lines 45-47 should now read:

11. The power converter of claim 1, further comprising:
a jitter control circuit that reduces electromagnetic
  interference emissions by jittering the frequency at which the Column 11, line 49, the word "uttering" should be changed to --jittering--.

The text of column 11, lines 47-49 should now read:

23. The integrated circuit of claim 15, further comprising:
a jitter control circuit that reduces electromagnetic
  interference emissions by jittering the frequency at which the Column 12, lines 34-35, the word "uttering" should be changed to --jittering--.

The text of column 12, lines 33-35 should now read:

32. The method of claim 27, further comprising:
reducing electromagnetic interference emissions by jittering
  the frequency at which the current flowing through Signed and Sealed this Twenty-ninth Day of December, 2009

David J. Kappos
*Director of the United States Patent and Trademark Office*